United States Patent
Mattison et al.

(10) Patent No.: US 12,547,735 B2
(45) Date of Patent: Feb. 10, 2026

(54) PREDICTIVE ARTIFICIAL INTELLIGENCE FOR DETERMINING SECURITY EVENTS AND MITIGATION STRATEGIES

(71) Applicant: Bank of America Corporation, Charlotte, NC (US)

(72) Inventors: Paul Mattison, Charlotte, NC (US); Matthew Williams, Plano, TX (US); Jennifer Raley, Mount Holly, NC (US); Richard Brown, Charlotte, NC (US); Amy Abreu, Methuen, MA (US)

(73) Assignee: Bank of America Corporation, Charlotte, NC (US)

( * ) Notice: Subject to any disclaimer, the term of this patent is extended or adjusted under 35 U.S.C. 154(b) by 27 days.

(21) Appl. No.: 18/776,630

(22) Filed: Jul. 18, 2024

(65) Prior Publication Data
US 2026/0023858 A1    Jan. 22, 2026

(51) Int. Cl.
G06F 21/57 (2013.01)
G06N 20/00 (2019.01)
G06Q 40/02 (2023.01)
H04L 9/40 (2022.01)

(52) U.S. Cl.
CPC .......... G06F 21/577 (2013.01); G06N 20/00 (2019.01); H04L 63/14 (2013.01); H04L 63/1441 (2013.01); G06Q 40/029 (2025.08)

(58) Field of Classification Search
CPC ....... G06F 21/577; G06N 20/00; H04L 63/14; H04L 63/1441; G06Q 40/029
See application file for complete search history.

(56) References Cited

U.S. PATENT DOCUMENTS

| | | | |
|---|---|---|---|
| 10,341,377 B1 * | 7/2019 | Dell'Amico | H04L 63/1416 |
| 11,562,304 B2 | 1/2023 | Lu | |
| 11,580,475 B2 | 2/2023 | Retna et al. | |
| 2019/0339685 A1 | 11/2019 | Cella et al. | |
| 2020/0019893 A1 | 1/2020 | Lu | |
| 2020/0210590 A1 * | 7/2020 | Doyle | G06F 21/577 |
| 2021/0272040 A1 | 9/2021 | Johnson et al. | |
| 2022/0114593 A1 * | 4/2022 | Johnson | G06F 18/214 |
| 2023/0179637 A1 * | 6/2023 | Nunn | H04L 63/0227 726/1 |
| 2023/0377004 A1 * | 11/2023 | Nair | G06N 20/20 |

(Continued)

FOREIGN PATENT DOCUMENTS

| | | | | |
|---|---|---|---|---|
| CN | 110059190 A | * | 7/2019 | G06F 16/2255 |
| CN | 119671611 A | * | 3/2025 | G06N 20/00 |

(Continued)

OTHER PUBLICATIONS

Zhou, machine translation of CN 110059190 A, p. 1-8 (Year: 2019).*

*Primary Examiner* — Christopher A Revak
(74) *Attorney, Agent, or Firm* — Banner & Witcoff, Ltd.

(57) ABSTRACT

Predictive analysis for potential future security events may be performed using machine learning and an artificial intelligence model. Machine learning may be based on historical security event data, and analyzed on micro and macro levels to determine possible future events and a likelihood that those future events may occur. Further, machine learning and artificial intelligence models may be used to determine mitigation strategies to address possible future events.

20 Claims, 6 Drawing Sheets

(56) References Cited

U.S. PATENT DOCUMENTS

2024/0289367 A1* 8/2024 Murphy ................ H04L 41/16
2025/0226977 A1* 7/2025 Taneja ................ H04L 9/0861

FOREIGN PATENT DOCUMENTS

| DE | 202024104656 U1 * | 11/2024 | ............ G06N 20/00 |
| WO | WO-2025141468 A1 * | 7/2025 | ............ G06N 3/088 |
| WO | WO-2025154928 A1 * | 7/2025 | ............ H04L 41/16 |

* cited by examiner

PREDICTIVE ARTIFICIAL INTELLIGENCE FOR DETERMINING SECURITY EVENTS AND MITIGATION STRATEGIES

BACKGROUND

Aspects described herein relate to electrical computers, systems, and devices for analyzing security events and performing predictive analyses to determine one or more expected future security events and mitigation strategies associated with the past and/or expected future security events.

Security incidents in computing and non-computing environments have increased dramatically over the years. Such incidents include theft, robberies, hacking, skimming, counterfeiting, jugging and the like. There exists a plethora of data regarding such incidents, but the use of this data has been limited to date. For example, it has often been difficult to analyze and use such data to determine patterns, identify perpetrators, and predict possible future events. In some cases, such analysis and use may be challenging as macro data trends might obfuscate micro data trends.

Additionally, in the limited forecasting that has been performed, such forecasting has been based on macro patterns. But, historically, micro security event patterns can often drive macro level fraud losses. Currently, there are very little tools and processes for evaluating such micro security event patterns and, in some instances, even macrolevel patterns, to help avoid losses, damage, security breaches, and the like, and to develop or identify mitigation strategies.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide a device, system, and process using artificial intelligence and machine learning to identify patterns, trends, sources, and tools for addressing security incidents and to more quickly identify and mitigate risks and losses associated with those security incidents. For example, aspects described herein relate to developing and training a machine learning (e.g., artificial intelligence (AI)) model that is capable of evaluating (e.g., determining/predicting) both micro- and macro-level trends and patterns using historical security events and mitigation strategies associated therewith as seed or training data. For example, using historical data and developing such an AI model, a system may identify trends by receiving security incident information in real-time and determining that one or more security events are expected or predicted to occur in a certain geographic location or that a certain type or types of security events will progress in a particular geographic direction (e.g., originating from the west and progressing toward the Midwest; originating from the north and heading to toward the Midwest; originating from the northeast region of the U.S. and heading toward the mid-Atlantic). Trends may also correspond to types of security incidents. For example, if skimming is detected in northern California, the AI model may predict that a rise in jugging will occur in that part of northern California within a day, a week, a month, or the like. Combinations of trends and patterns may also be identified.

According to one or more other aspects, using an AI predictive model, a system may further identify mitigation strategies and implementation plans prior to a security incident occurring. For example, based on identified trends, the model may generate plans for implementing additional security (hardware, software, personnel, etc.) at certain systems, devices, stores, and/or geographic locations ahead of a predicted security incident occurring. Additionally, the predictive AI model may determine types of security apparatuses to use (e.g., bars, privacy screens, keypad shields) at the various locations based on the type of security incident predicted to occur at those locations. The system may also account for the manner in which certain security incidents are performed by perpetrators. For example, skimming may be performed in a variety of ways, and each way may be associated with a different mitigation strategy.

According to further aspects, the AI predictive model may be trained on and use as input, various data, including customer reports and inquiries, social networking posts and information, news articles, internal incident reports, police reports, and the like and/or combinations thereof. Various types of data may be weighed in terms of importance or trustworthiness as desired.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed herein, security incidents such as robberies, theft, jugging, skimming, white listing, malware, jackpotting, hacking and the like may be a threat to computer systems, infrastructure, individuals, and/or organizations. For example, malicious actions affecting the security of a computer system may impact the ability of the computer system to process legitimate interactions and transactions. In a particular example, an automated teller machine (ATM) may be the target of skimming or theft and cause the ATM to be temporarily or permanently closed to future transactions once some threshold number of events have occurred. In another example, an Internet café may be the target of malware or hacking and may be subject to undesirable security protocols (e.g., closing earlier than desired, limiting the types of applications or network sites that may be accessed, etc.), requiring certain types of identification, any of which may negatively affect the business.

Accordingly, aspects described herein provide for a predictive AI system configured to process and analyze security incidents and to determine expected future security incidents and mitigation strategies. The system may analyze such incidents at both micro and macro levels to identify corresponding patterns and trends. The system may use machine learning models to analyze historical security incidents in order to identify trends and make predictions. For example, a machine learning model may be used to analyze past security incidents to identify geographic locations, manners in which security incidents were performed, a type of security incident, a magnitude of the security incident, a speed or duration of the security incident, and the like. The machine learning model may further identify progressions or trends in security incidents over time. For example, the machine learning model may determine that security incidents tend to start in a first location and progress toward a second location or in a second direction within a certain amount of time. In another example, the machine learning model may determine that a first type of security incident tends to be followed by a second type of security incident in the same geographic location or in a different geographic location within a certain time period.

According to one or more further aspects, predictions or conclusions drawn by the predictive system may be further reviewed and confirmed. For example, a second level of review of any determined trends or conclusions drawn by the machine learning model may be performed by a second system, a second machine learning model, a manual review and/or the like and/or combinations thereof. That review and conclusions of that review may be used to further train the predictive AI system and associated machine learning model to refine the analyses and predictive capabilities of the system.

These and various other arrangements will be discussed more fully below.

Figure 1A:
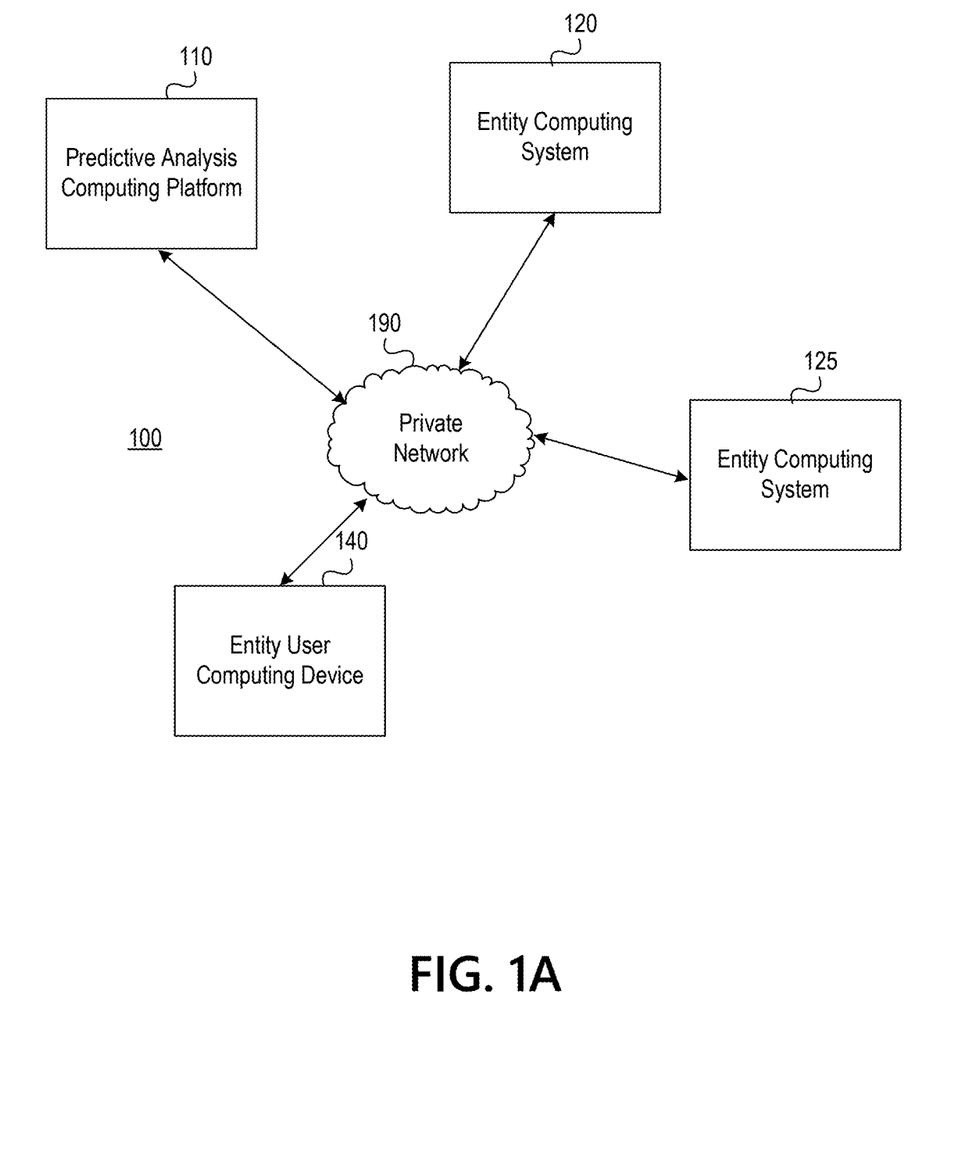
FIGS. 1A-1B depict an illustrative computing environment for predictive security incident analysis system and service in accordance with one or more aspects described herein.
Figure 1B:
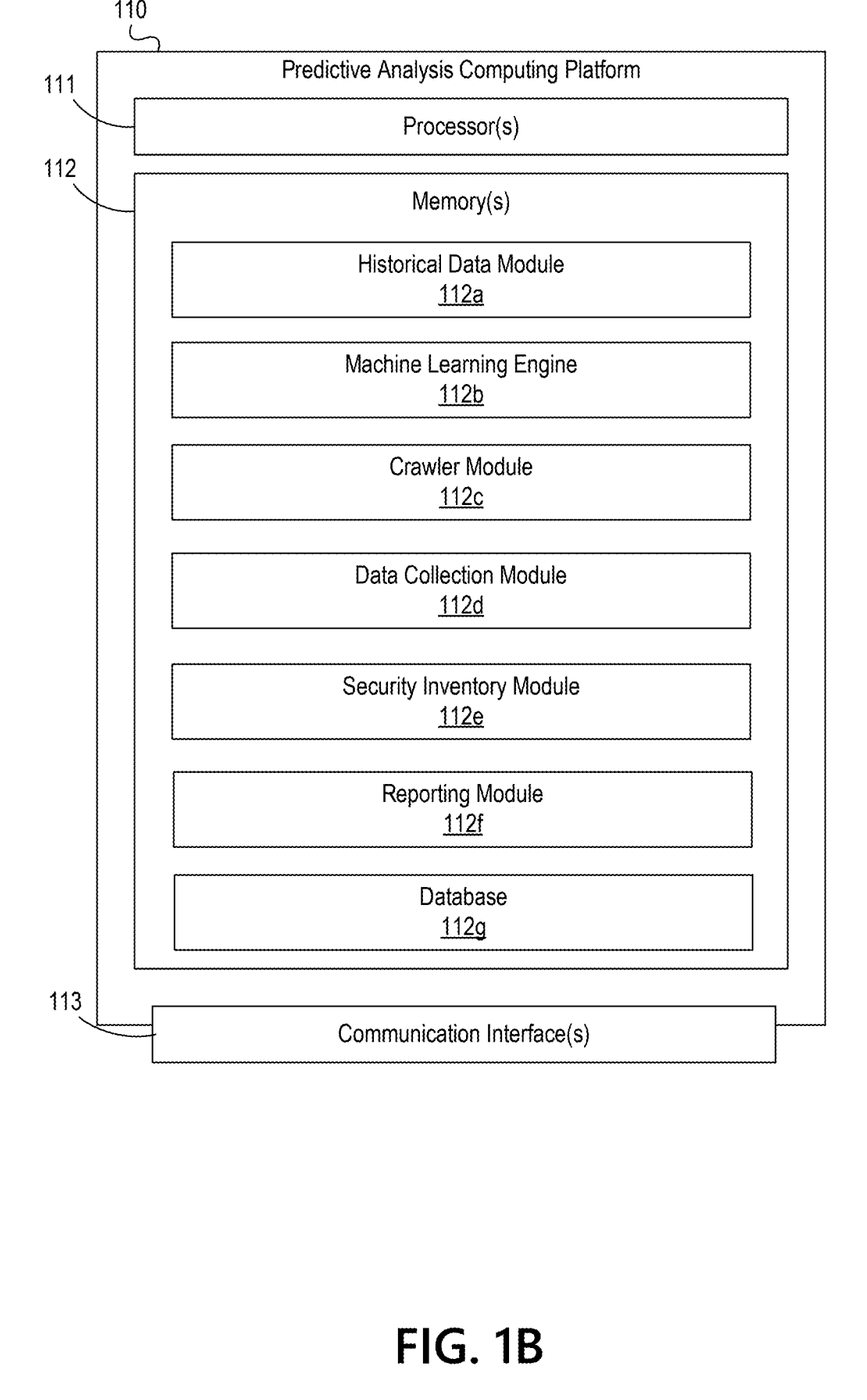

FIGS. 1A-1B depict an illustrative computing environment for implementing a predictive security analysis system and process in accordance with one or more aspects described herein. Referring to FIG. 1A, computing environment 100 may include one or more computing devices and/or other computing systems. For example, computing environment 100 may include predictive security analysis computing platform 110, entity computing system 120, entity computing system 125 and entity user computing device 140. Although two entity computing systems 120, 125 and one entity user computing device 140 are shown, any number of systems or devices may be used without departing from the invention.

Predictive security analysis computing platform 110 may be or include one or more computing devices (e.g., servers, personal computers (PCs), mobile devices, server blades, or the like) and/or one or more computing components (e.g., memory, processor, and the like) and may be configured to dynamically, and in real-time, monitor security incident information such as news articles, social network postings and information, dark web information, customer reports and interactions, transactions conducted by an organization, and the like. Additionally, in some arrangements, the predictive security analysis computing platform 110 may generate alerts, recommendations, information, reports, presentations, notifications and commands. Such alerts, commands, and the like may be provided to another device (e.g., entity user computing device 140 and/or entity computing systems 120, 125). The other device may include one or more of a device at which a security incident has occurred, a device at which a security incident is predicted to occur, a user device configured to monitor security incidents and predicted security incidents, a device operated by security personnel, and/or the like. In some examples, the alerts, comments, presentations, reports, and/or notifications may be transmitted to the entity user computing device 140 and/or entity computing systems 120, 125 to cause those devices to execute one or more commands. The other device may then be controlled to execute the command (e.g., display an alert or terminate an interaction, execute security script to log transactions, execute security code to limit functionality, etc.) in response to receiving the communication from the predictive security analysis computing platform 110.

In one arrangement, predictive security analysis computing platform 110 may be notified by entity computing system 120 and/or 125 of a security incident occurring at the entity computing system 120 and/or 125 and/or another device at the same geographic location. For example, the entity computing system 120 and/or 125 may be an ATM or other computer-based customer-interaction device. In response to receiving this notification, the predictive security analysis computing platform 110 may use the security incident information from entity computing system 120 and/or 125 as input in a machine learning model to predict one or more future security incidents. Additionally or alternatively, the predictive security analysis computing platform 110 may determine one or more mitigation strategies or plans for the entity computing system 120 and/or 125 reporting the security incident and/or for one or more other devices, locations, buildings, etc. corresponding to predicted security incidents.

When predicting future security incidents, the predictive security analysis computing platform 110 might not only use the then-reported security incident but may also use historical security incident data. For example, the predictive platform 110 may determine frequent trends in security incidents to identify patterns in geographic progression. In other examples, the predictive platform 110 may determine trends showing that one type of security incident frequently progresses to or into other types of security incident either at the same location or within a predefined proximity. In still other examples, the predictive platform 110 may be configured to determine trends or other predict future security incidents based on a type or model of device (e.g., type or model of entity user computing device 140).

Further, when determining mitigation strategies, the predictive security analysis computing platform 110 may evaluate past security incidents as well as the security protocols, software, and apparatuses that were in place when the security incidents occurred. This may inform the platform 110 of mitigation strategies that worked or did not work or an effectiveness depending on the type of security incident that occurred. In some arrangements, data about the lack of security incidents may also be used in the predictive security analysis computing platform 110 as a further type of training data for the predictive machine learning model. Data about a machine or location that has not had many (e.g., a threshold number) or any security incidents may be used to determine or identify effective security protocols and apparatuses. Mitigation strategies may be specific or categorized based on device type, location type (e.g., gas station versus grocery store), population of a geographic location (e.g., <10,000 people, >1 million people, etc.), particular device model, type of security incident, magnitude of security incident, and the like and/or combinations thereof. In some cases, mitigation may include deploying or requesting an amount of police or law enforcement presence in a particular area or within a proximity to a particular geographic location.

Entity computing system 120 and/or entity computing system 125 may be or include one or more computing devices (e.g., servers, personal computers (PCs), mobile devices, server blades, or the like) and/or one or more computing components (e.g., memory, processor, and the like) and may be configured to host or execute one or more organization applications or systems. For instance, entity computing system 120 and/or entity computing system 125 may host or execute internal or customer-facing applications or systems that may be accessed by one or more users in-person or remotely, such as via a network, such as a private network, public network, or the like. Entity computing system 120 and 125 may be terminals operated by employees (e.g., administrators, analysts, agents, and the like) for providing products or services, general purpose computing devices providing function-specific applications, and/or function-specific devices such as ATMs, electronic vault, cash register, point of sale system, and the like and/or combinations thereof. The entity computing system 120 and/or 125 may further provide security incident information such as periodic or aperiodic status reports about system functions. For example, entity computing system 120 and/or 125 may report applications currently installed and/or executing on the device at a particular time or during a particular time period. In other examples, entity computing system 120 and/or 125 may generate reports based upon a user trigger or command and/or based on detecting unauthorized or irregular activities. These reports may be transmitted to the predictive security analysis platform 110 and/or entity user computing device 140. The systems 120 and 125 may also be configured to receive notifications or commands to be executed (e.g., security protocols or mitigation strategies).

Entity user computing device 140 may be or include a computing device such as a desktop computer, laptop computer, tablet, smartphone, wearable device, and the like, that is associated with a user (e.g., an employee) of the organization. Entity user computing device 140 may communicate with predictive security analysis computing platform 110 and/or entity computing systems 120, 125 to receive notifications and other information associated with security trends, incidents, predicted events, and recommended mitigation strategies or plans. In some arrangements, the entity user computing device 140 may be used to confirm whether a determination (e.g., a prediction or determined trend) made by the AI model is valid. This confirmation/determination (positive or negative) may be provided to the AI model for further training.

As mentioned above, computing environment 100 also may include one or more networks, which may interconnect one or more of predictive security analysis computing platform 110, entity computing system 120, entity computing system 125, and/or entity user computing device 140. For example, computing environment 100 may include network 190. Network 190 may include one or more sub-networks (e.g., Local Area Networks (LANs), Wide Area Networks (WANs), or the like). Network 190 may be associated with a particular organization (e.g., a corporation, financial institution, educational institution, governmental institution, or the like) and may be a private network interconnecting one or more computing devices associated with the organization. For example, predictive security analysis computing platform 110, entity computing system 120, entity computing system 125, and/or entity user computing device 140 may be associated with an organization (e.g., a financial institution), and network 190 may be associated with and/or operated by the organization, and may include one or more networks (e.g., LANs, WANs, virtual private networks (VPNs), or the like) that interconnect predictive security analysis computing platform 110, entity computing system 120, entity computing system 125, and/or entity user computing device 140 and one or more other computing devices and/or computer systems that are used by, operated by, and/or otherwise associated with the organization. Additionally or alternatively, network 190 may be a public network, such as the internet, that may connect the systems and devices described.

Referring to FIG. 1B, predictive security analysis computing platform 110 may include one or more processors 111, memory 112, and communication interface 113. A data bus may interconnect processor(s) 111, memory 112, and communication interface 113. Communication interface 113 may be a network interface configured to support communication between predictive security analysis computing platform 110 and one or more networks (e.g., network 190, or the like). Memory 112 may include one or more program modules having instructions that when executed by processor(s) 111 cause predictive security analysis computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of predictive security analysis computing platform 110 and/or by different computing devices that may form and/or otherwise make up predictive security analysis computing platform 110.

For example, memory 112 may have, store and/or include historical data module 112a. Historical data module 112a may store instructions and/or data that may cause or enable predictive security analysis computing platform 110 to receive or obtain data related to past security incidents. The data may include a type of security incident, an identity of an individual or organization responsible for the security incident, a type of device involved, a duration of the incident, a magnitude of the incident (e.g., in financial terms such as dollar amounts and/or resources required to resolve the incident), a time and date of the incident, one or more mitigation strategies applied or recommended, geographic location of the incident, data about the security of the device or location after the mitigation strategies were applied (e.g., successes or failures of a mitigation strategy or corrective action), and the like and/or combinations thereof. This data may be used to train one or more machine learning models.

For instance, predictive security analysis computing platform 110 may have, store and/or include machine learning engine 112b. Machine learning engine 112b may store instructions and/or data that may cause or enable the predictive security analysis computing platform 110 to generate, train, execute, update and/or validate one or more machine learning models. In some examples, machine learning may be based on regression, classification or other suitable techniques. The one or more machine learning models may be trained using the historical data received or obtained through historical data module 112a to detect patterns, trends, or sequences in the historical information. The machine learning model or models may include one or more nodes representing data points in a universe of security events and/or attribute values of security events. These nodes or data points may be weighted so that the significance or impact of those parameters (e.g., inputs, parameters, attributes) may be decreased or increased as desired or to be more reflective of actual events, trends, and patterns. The weighting in the AI model may be determined by computer algorithms by determining frequency of occurrences of various parameters or data points and increasing the weights when the frequency is of a certain level, and decreasing the weights if the frequency is less than a certain level. Nodes may be connected or not connected depending on a variety of factors. For example, some nodes may be connected if they share common attribute values. In other examples, connections may indicate a relationship where one set of security event attribute values have a strong correlation to another set of security event attribute values. That correlation may, in some arrangements, represent a trend or pattern. Moreover, connections may be directional and may be weighted to indicate a strength of the correlation between two sets of security event attribute values.

Multiple machine learning models and/or machine learning engines 112b may be used. For example, one machine learning model may be used for a first type of product or service or security incident, while another machine learning model may be used for a second type of product or service or security incident. Machine learning models may also be specific to geographic areas (e.g., regions of a country, provinces, countries, cities, towns, zip codes, area codes, states, etc.), types of devices involved in security incidents, and the like and/or combinations thereof.

Predictive security analysis computing platform 110 may further have, store and/or include crawler module 112c. Crawler module 112c may also be referred to as a data gathering module. Crawler or data gathering module 112c may be configured to navigate to and through one or more network sites to obtain data and information. For example, crawler module 112c may include a first crawler component for crawling news sites or sources to obtain information about reported security incidents. Crawler module 112c may also include a second crawler component for crawling social networks to obtain information about security incidents. For example, the second crawler component may be configured to analyze social network posts and profiles and obtain information upon detecting reports or posts relating to security incidents. Any number of crawler components may be used or part of crawler module 112c. Crawler module 112c may be configured to detect or otherwise identify information relating to particular types of security incidents such as computer viruses, financial security incidents, malware, denial of service attacks, network security events, and the like and/or combinations thereof. Crawler module 112c may also be configured to crawl or gather data from sources such as police reports, police audio communications (e.g., police radio channels), television programming, streaming content, customer service reports, customer agent reports and the like and/or combinations thereof. Different crawlers or crawler components may be used for each type of information source. Alternatively, the same crawler or crawler component may be configured to crawl multiple types of data sources.

Predictive security analysis computing platform 110 may further have, store and/or include data collection module 112d. Data collection module 112d may take raw data or aggregate data obtained by the crawler module 112c and/or one or more components thereof and organize, filter, and/or otherwise modify the data for use in the predictive analysis platform 110 (e.g., machine learning engine 112b). For example, the data collection module 112d may filter the aggregate or raw data collected by crawler module 112c to remove irrelevant information or information that is not needed for purposes of identifying security trends, mitigation strategies and predicting possible future security events. Data collection module 112d may include one or more sub-modules or components that are used for different types of security events, geographic regions, types of devices, and the like and/or combinations thereof. In some example, data collection module 112d may apply different algorithms (e.g., filters, organizational algorithms) depending on various attributes of the data. The data collection module 112d may also structure the data according to a desired data structure (e.g., uniform data format or structure) for use in training or otherwise as input in the machine learning engine 112b. For example, data collection module 112d may parse social network data or news articles to extract certain attributes of a security incident and store that information as values for those attributes in a predefined security incident data structure.

Predictive security analysis computing platform 110 may further have, store and/or include security inventory module 112e. Security inventory module 112e may be configured to store information about security hardware, software, and/or other resources and the availability of those resources for use in mitigation strategies. Security inventory module 112e may also help coordinate logistics for deploying certain security hardware and/or software. For example, security inventory module 112e may store information about types of security hardware and their current storage location, as well as its availability for deployment or use. Security inventory module 112e may further store information about available software as well as information about available personnel for installing or implementing the software (e.g., geographic location, security clearance requirements, etc.). Security inventory module 112e may also generate instructions, plans, orders, or recommendations for delivering security hardware or scheduling installation of security hardware and/or software.

Predictive security analysis computing platform 110 may further have, store and/or include a reporting module 112f. Reporting module 112f may be configured to generate reports based on determinations made through the machine learning engine 112b. For example, reporting module 112f may generate charts, heat maps, graphs, and the like to show security trends, predicted future security events, mitigation strategies and effectiveness thereof, and the like and/or combinations thereof.

Predictive security analysis computing platform 110 may further have, store and/or include database 112g. Database 112g may store data related to the various interactions such as a calling or chat-initiating party, geographical locations of the calling or chat-initiating party, a type of product or service being requested, a time of day, and/or other data that enables performance of aspects described herein by the predictive security analysis computing platform 110.

Figure 2:
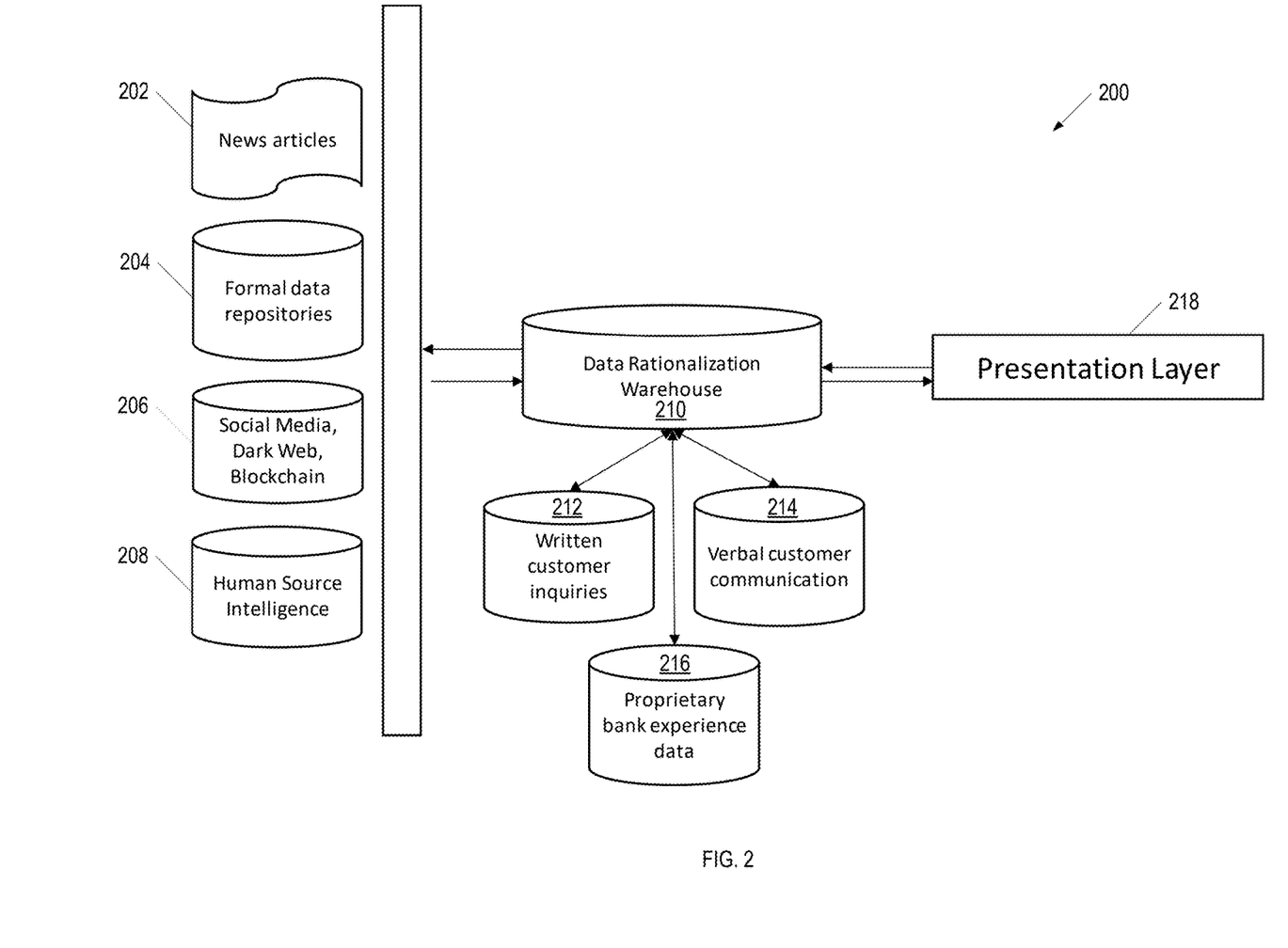
FIG. 2 illustrates a data collection architecture in accordance with one or more aspects described herein.

FIG. 2 illustrates an example data collection and processing architecture according to one or more aspects described herein. The architecture 200 includes a variety of data sources including news articles 202, formal data repositories 204, network information sources 206, and human intelligence sources 208. News articles 202 may include information reported through one or more news channels or sources. For example, news articles 202 may include news websites, television or streaming news channels, audio news sources (e.g., radios), and/or other news reporting channels. Formal data repositories 204 may include reporting or information published or otherwise provided through official channels such as government organizations. Such sources or channels may include law enforcement reports, court records, filed complaints (e.g., through court or law enforcement), property records, and the like and/or combinations thereof. Network information sources 206 may include online information sources such as social networks, the web, the dark web, blockchain networks and the like. Further, human intelligence sources 208 may include human agents tasked to collect information about certain security events or incidents and provide that information to an organization.

The architecture 200 further includes a data rationalization warehouse 210 that may be part of a particular organization (e.g., a network security organization, a government organization, a financial institution, and the like). The data rationalization warehouse 210 may receive or collect the information from each of the sources 202, 204, 206 and 208 as well as information obtained through internal channels. For example, data rationalization warehouse 210 may obtain information relating to written customer inquiries 212, verbal customer interactions and communications 214, and other proprietary organization experience data 216. Written customer inquiries 212 may include written questions, requests, and/or complaints submitted by a customer of the organization. These inquiries 212 may be submitted in electronic form or may be provided through physical media and subsequently converted into electronic form. Verbal customer interactions and communications 214 may include voice communications from a customer, and may include voice calls with customer service agents, voice mail or recordings left by the customer, recordings of customer audio during an interaction with an organization device (e.g., a library computer, a government computing device (e.g., cell phone, laptop, PC), ATM, automated customer kiosk, etc.). In some cases, the verbal customer interactions and communications 214 may be automatically and electronically transcribed for the warehouse 210. Alternatively, warehouse 210 may perform the transcription.

Proprietary organization experience data 216 may encompass a variety of information. For example, video footage of certain locations or devices may be included as part of the experience data 216. Additionally or alternatively, notes generated and provided by a customer agent may be part of experience data 216. Still further, organization security event, device, customer, and/or transaction details and information may be included as part of proprietary organization experience data 216.

The internal organization information 212, 214, 216 and external security information 202, 204, 206, and 208 may all be used (in part or in total) by the warehouse 210 as training data and/or as input to determine potential trends and predicted security incidents. Additionally or alternatively, the warehouse 210 may store this information in order to identify possible mitigation strategies. Additionally, warehouse 210 may be configured to use the information as well as any outputs from a predictive AI model to generate one or more reports for a presentation layer 220. The presentation layer 220 may provide visualizations and text-based information showing trends, heat maps (e.g., based on number of incidents, magnitude of incidents, types of incidents, types of devices involved in the security events, etc.), mitigation effectiveness charts, and the like and/or combinations thereof. The presentation layer 220 may include one or more user interfaces that allow a user to manipulate or edit the types of information and visualizations provided in the reports. For example, a user may customize a report (e.g., types of visuals, types of information included, types of security incidents to include, and the like) through the presentation layer 220.

In some examples, the presentation layer 220 may also provide an interface through which a user may execute simulations. For example, a user may request the AI model to generate an expected level of security incidents or trends in security incidents based on various hypothetical inputs. These inputs may include mitigation strategies such as implementation of security hardware and/or software, implementation of security personnel, identification of particular geographic locations for the mitigation strategy, identification of types of devices, and the like and/or combinations thereof. Based on this input (e.g., planned, recommended, or hypothetical strategies), the AI model may determine possible or predicted future levels and trends in security incidents based on historical data and the corresponding machine learning model.

Figure 3:
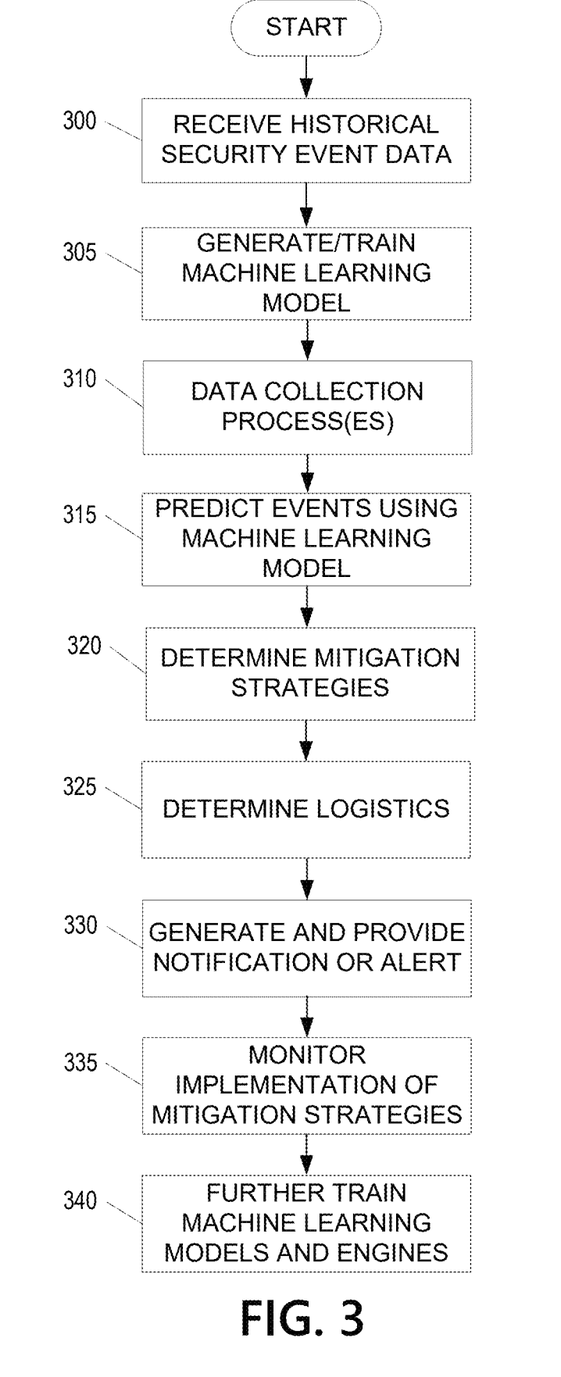
FIG. 3 depicts an illustrative method for determining security incident patterns and trends, predicting future security events, and determining mitigation strategies according to one or more aspects described herein.

FIG. 3 is a flowchart illustrating an example method by which a predictive analysis system such as predictive security analysis computing platform 110 (FIG. 1) may perform predictive analysis to determine expected security events or trends in security events, as well as to determine possible mitigation strategies. In step 300, the predictive security analysis system may receive historical security event data from one or more data sources. These sources may be internal to the organization or external or a combination of both. This data may be automatically collected and stored in a database and retrieved by the predictive security analysis system based on various parameters. For example, the predictive security analysis system might only retrieve security event data matching certain parameters such as a type of device, a type of product, a type of service, a type of transaction, a geographic location, a particular time period, a type of security event (e.g., malware, jugging, theft, skimming, etc.), and the like and/or combinations thereof.

In step 305, the predictive analysis system may generate or train a machine learning model based on the obtained historical security event data. The artificial intelligence machine learning model may be trained or generated in an example process shown in FIG. 4.

Figure 4:
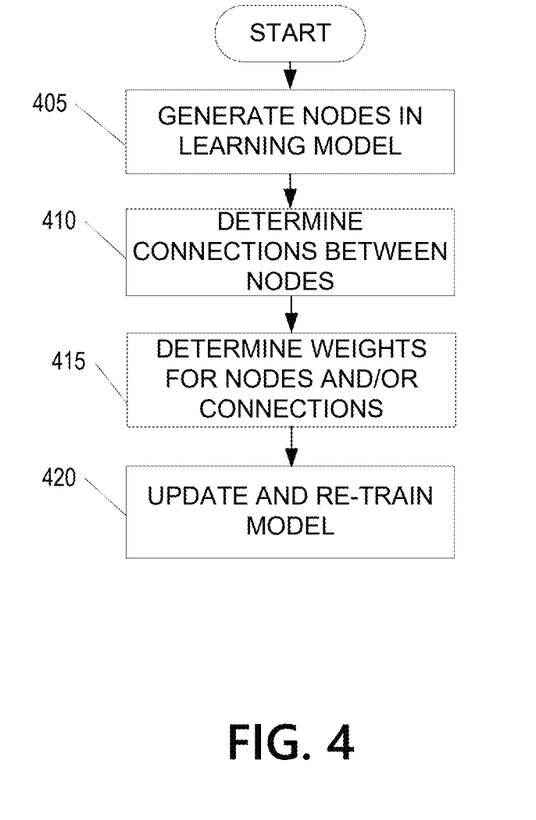
FIG. 4 depicts an illustrative method for generating an AI machine learning model according to one or more aspects described herein.

In FIG. 4, once the historical security event data has been obtained, predictive analysis system may generate one or more data points or nodes in the machine learning model in step 405. The nodes may include various parameters or attributes and values associated with those parameters. In some examples, the nodes may represent one or more sets of attributes or parameters representing one or more security incidents in the historical security event data. In a particular example, each security incident in the historical data may be abstracted out into a set of attributes and those attributes may be used to determine the number of data points or nodes to be created in the machine learning model. The set of attribute values may be predefined based on what is important or relevant to the organization. For example, a set of attributes may include a type of security incident, magnitude of the security incident, a geographic location (city name, zip code, area code, etc.), a mitigation response, and the like. A single data point may then be created for each unique set of attribute values. Accordingly, in one example having a set of 1000 historical security incidents, there may be 250 unique sets of attribute values corresponding to the desired set of attributes. In this example, the model may be generated with 250 data points or nodes representing those unique combinations. In one or more arrangements, a set of historical security event data may be used to generate a first node representing skimming (security incident type) incidents involving ATMs (device type) in a particular zip code (geographic location). In some examples, the common attribute set may further include a type of mitigation applied in response to the event. Although nodes may represent a particular set of shared attribute values, each node may also store or otherwise be associated with the details and parameters (e.g., a record) of each specific security incident in the historical data set having those common attribute values.

In step 410, the predictive analysis system may identify connections between nodes in the model. Connections may represent a relationship between the data points or nodes. Such relationships may include a temporal relationship, geographic relationship, a cause and effect relationship, trends, and the like and/or combinations thereof. In some examples, a connection may be established between two data points if a sufficient temporal correlation exists. That is, if a sufficient number of security incidents associated with a first data point occurs within a threshold amount of time of one or more security incidents associated with a second data point, a connection may be formed. Similarly, connections may be identified based on geographic proximity. For example, the predictive analysis system may determine whether a sufficient correlation exists between security incidents of a first data point and security incidents of a second data point as to a threshold geographic proximity. In some arrangements, connections may be directional to represent that events having one set of attribute values typically follow (in time) events having another set of attribute values. Additionally or alternatively, multiple types of connections may be defined and used in the machine learning model. For example, both geographic connections and temporal connections or connections that account for both geography and time may be used and defined within the model.

In step 415, the predictive analysis system may further determine weights for each of the connections between the nodes and/or the nodes themselves. For example, the weights may represent a likelihood or a strength of correlation between two or more nodes. Weights may be determined based on frequency of occurrence, importance of the security event, magnitude of the security event, common attributes, common attribute values, and the like and/or combinations thereof. These correlation weights may be determined based on the historical security event data using temporal and/or geographic attributes as discussed herein. This type of machine learning model may thus be used to identify possible trends or future security events based on an input of a current security incident or event. In some examples, a node may also be associated with a weight. For example, in some arrangements, if a first security event having attributes matching a first data point occurs, the connection weights from that data point node may be used by the machine learning engine to predict which of two or more second security events or types of security event is more likely to occur. A node weight may correspond to a sum or other aggregation of the connection weights associated with that node (e.g., weights of connections extending to or from that node). In one example, node weights may be a sum of the connection weights.

In step 420, the predictive analysis system may further update and re-train the model based on further security incident data as time progresses and/or as data regarding additional security incidents is obtained. Accordingly, the training and updating of the model may be on-going, in real-time and/or recursive.

Referring again to FIG. 3, once a predictive AI security model has been trained and/or otherwise generated, the predictive analysis system may subsequently execute one or more data collection processes in step 310. In one example, the predictive analysis system may invoke one or more data crawlers (e.g., crawler module 112c) to navigate to and collect information from a variety of different sources. These sources may include websites, news channels, television broadcasts, social networks, blockchain networks, various types of web networks (e.g., the dark web), other public information sources (e.g., law enforcement communications, postings, information portals, government publications, government notifications, etc.), and the like and/or combinations thereof. In some arrangements, multiple data crawlers may be executed for different types of content sources (e.g., news articles versus social networking posts versus radio broadcasts). In some arrangements, the data crawler may further transform or modify the collected information into another form that may be more usable or conducive to use with the predictive AI model. For example, audio from a radio broadcast recognized as reporting on a security incident may be processed into transcribed text. In another example, video from a television report about a security incident may be processed using image analysis to determine various characteristics of the security event such as a type of device, organization, or individual involved in the security incident, a location, a time of day, and the like.

In step 315, the predictive analysis system may input or otherwise process the collected security event information through the machine learning engine and model to determine one or more predicted security events. In one or more arrangements, this process may include matching the security event information to one or more nodes or data points in the model based on security event attribute values such as security event type, device type, geographic location, time of day, and the like and/or combinations thereof. From there, the process may then determine possible trends based on the connections associated with the one or more nodes or data points. The connections may then be used to determine or predict possible future security events based on one or more end points (i.e., connected nodes) of those connections. For example, if collected security event information identifies an ATM (device type) jugging event (security event type) in a first zip code (i.e., geographic location) during the hours of 8 PM to midnight (i.e., time of day), those attribute values may match or strongly correlate with a first node which is connected to a second node. That second node may correspond to jugging security events associated with ATMs occurring between midnight and 3 AM (time of day) in a nearby second zip code, different from the first zip code. Based on this connection and correlation, the predictive model may determine that there is a high likelihood of an ATM jugging security event occurring in the second zip code between the hours of midnight and 3 AM. In another example, the collected security information may show that a robbery (security event type) occurred at a gas station (location type) between the hours of 3 AM and 6 AM (time of day) involving multiple individuals (method of attack). In this case, the AI model may determine that this security event profile most closely matches a third data node that is connected to fourth and fifth data nodes. Each of the fourth and fifth data node may correspond to a different security event profile. The predictive model may use the connection weights between the third data node and each of the fourth and fifth data nodes to then determine a likelihood that a predicted or possible future security event corresponding to the profiles of each of those fourth and fifth data nodes will occur. The predicted security events may include a variety of information including expected device type, expected security event type, predicted magnitude of the security event, predicted law enforcement response, predicted time or range of times, predicted location, and the like and/or combinations thereof.

In some cases, the predictive analysis system may generate multiple predictions (e.g., multiple possible future security events) and determine and provide a probability of occurrence for each. In some examples, these probabilities may be determined based on the weights of each data node and/or connection between two data nodes. Accordingly, in one or more arrangement, the greater the weight of a connection between two data nodes, the higher the likelihood that a security event matching a profile of the connected data node will occur. Additionally or alternatively, the probability may also account for a degree with which the security event information used as input matches a data node profile. For example, attributes of the inputted security event information might only match 10 out of 12 security event attributes associated with a particular node or data point. That percentage match (or strength of correlation) may be used to modify the probability that a second security event (e.g., corresponding to another node or data point connected to the matched node) will occur. In a particular example, the probability may be lowered if the degree of match or correlation is lower, and increased if the degree of match or correlation is high or higher. Each of these predictions may be referred to as a candidate security event and the attributes associated therewith referred to as a candidate attribute. For example, predicted security events may be associated with one or more candidate geographic locations with associated probabilities. Similarly, predicted security events may be defined by one or more candidate times or device types also with associated probabilities. In some cases, the system may select one or more of the possible predicted security events based on the probability for mitigation or further evaluation or processing.

Additionally or alternatively, the predictive analysis system may generate multiple predictions based on portions (e.g., a proper subset) of the collected security event information. For example, the predictive analysis system may filter the collected information into geographic areas and use each set of collected information corresponding to one geographic area to generate one or more respective predictions or trends. In another example, predictive analysis system may separate the security events based on time and generate predictions separate using particular ranges of times and corresponding security events identified in the collected information. The system may then proceed to evaluate and process each of the predicted security events. Alternatively, the system might only evaluate or process possible security events based on a threshold probability or by selecting a number of possible security events having the highest probabilities.

In step 320, the predictive analysis system may further determine one or more mitigation strategies to address the predicted security events determined from step 315. In one or more examples, the mitigation strategies may be generated based on historical mitigation strategies and data about success rates of those strategies in preventing further security events. This determination may be made using the machine learning engine in similar fashion to predicting future security events. For example, if a data point or node specifies types of mitigation strategies implemented and there is few to no connections to other nodes (i.e., low correlation with other security events and therefore, low indication of a trend), the predictive analysis system may determine that the corresponding type of mitigation strategy was effective. Conversely, if a data point has strong correlation with one or more other data points (i.e., other security events), the predictive analysis system may determine that one or more mitigation strategies associated with that data point is of lower effectiveness. In some examples, a mitigation strategy may include deploying security enhancements at multiple locations or at multiple devices based on the probability of a predicted security event at each of those locations or devices. Further, the type of security enhancement (e.g., security hardware/software/other strategy) at each of those locations or devices may differ based on the probabilities.

In step 325, the predictive analysis system may determine one or more security logistics plans for implementing one or more mitigation strategies determined in step 320. This process may include determining available inventory of security hardware and/or software, identifying a location requiring a particular security hardware and/or software, determining available security implementation resources (e.g., implementation personnel, required implementation devices, law enforcement resources, etc.), and determining a plan for routing and scheduling the security hardware and/or software based on the determined needs (e.g., the mitigation strategy or plan). Security hardware may include a variety of items including security doors, geographic positioning system (GPS) trackers, swing bars, cameras, safety decals, vibration alarms, and the like and/or combinations thereof. Security software may include monitoring software, facial detection software, software for terminating a transaction or activity in response to certain triggers, multi-factor authentication software, anti-virus or anti-malware code and the like and/or combinations thereof. A logistics plan may include determining a source of a security hardware or software and a route for delivering that security hardware and/or software from the source to the intended destination (e.g., a device or location where a predicted security event may occur). The logistics plan may be developed considering timing requirements (e.g., how far or close in the future a predicted security event will occur) and shipping or delivery times.

In step 330, the predictive analysis system may generate and transmit a notification and/or alert to one or more other systems and devices. For example, the notification or alert may be transmitted to security personnel to alert them as to potential future security incidents and to confirm a mitigation strategy or plan. In one or more arrangements, the notification or alert may be generated and transmitted prior to determining security logistics plan (e.g., step 325). The process for determining security logistics plan for executing a mitigation strategy might only be performed after personnel has confirmed or selected a mitigation strategy to apply. In some arrangements, the notification and/or alert may also be transmitted to government entities such as law enforcement. Additionally or alternatively, the notification or alert may include one or more visualizations or text-based reports (or a combination of both) to help personnel evaluate and digest the security event data and recommendations. Further, the alerts or notifications may include or more commands that cause a security system to perform a particular function or execute particular code. For example, the alert may include a command to shut down one or more systems or devices to outside interactions. In a particular scenario, a command may be issued to an ATM to change to a maintenance state or a state in which the ATM cannot or will not accept customer interactions. In another scenario, a command may be issued to security monitoring hardware or software to begin recording all activity at a particular location or device.

In step 335, the predictive analysis system may monitor the implementation of the mitigation strategies and information about the predicted security event location and/or device. For example, the predictive analysis system may monitor to determine whether the predicted security event occurred. If the predicted security event occurred, the predictive analysis system may determine attributes associated with the event, e.g., to determine the effectiveness of the mitigation strategy.

In step 340, the monitored information including the predicted event, whether the predicted event occurred, information about the predicted security event (if it occurred), a mitigation strategy implemented, and the like may be used to further train the machine learning engine as discussed herein. That is, the monitored information may become part of the historical security event data and used to update the nodes, connections, and weights of the predictive model.

Figure 5:
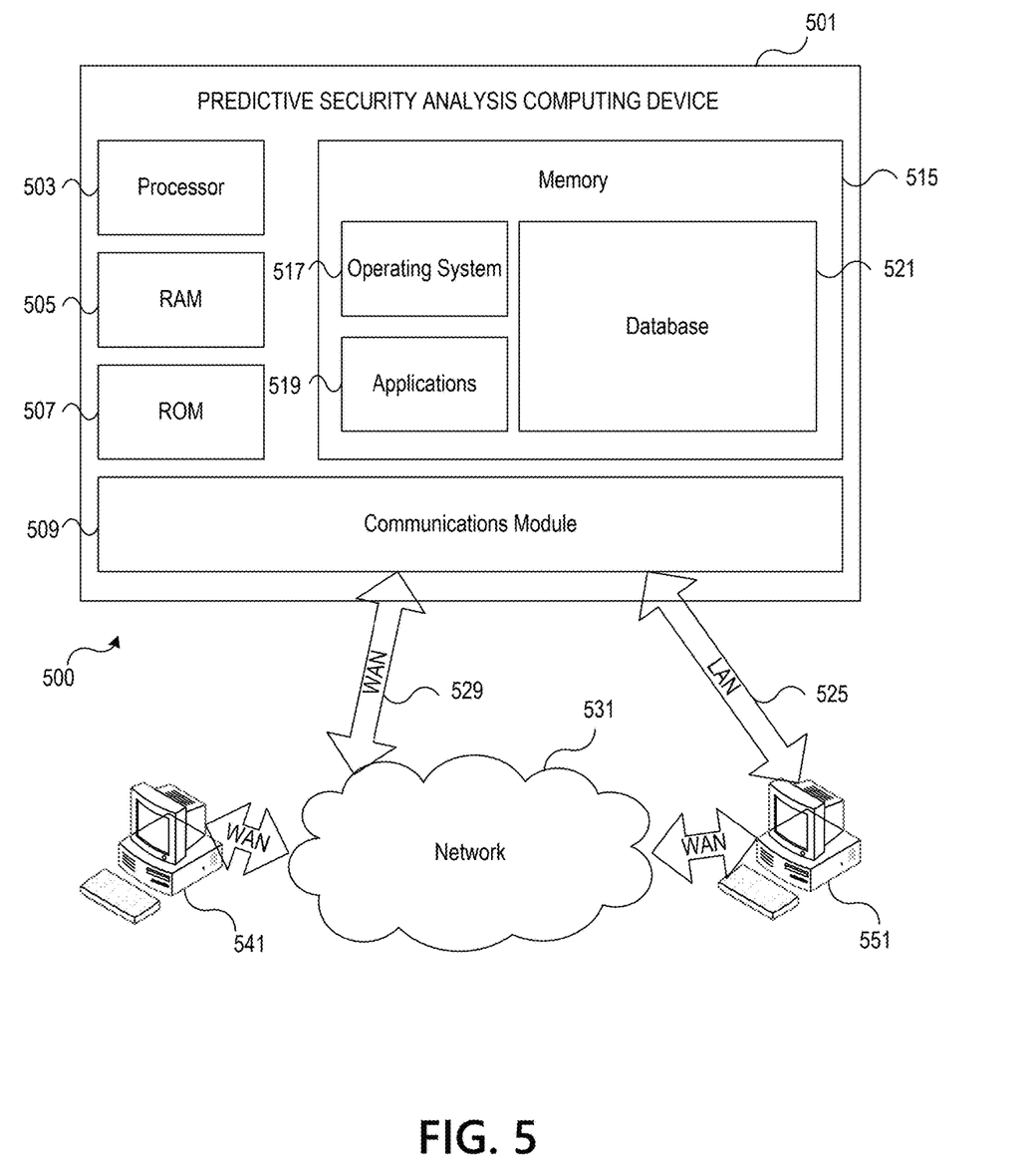
FIG. 5 depicts an illustrative method for developing and training a predictive analysis machine learning model according to one or more aspects described herein.

FIG. 5 depicts an illustrative operating environment in which various aspects of the present disclosure may be implemented in accordance with one or more example embodiments. Referring to FIG. 5, computing system environment 500 may be used according to one or more illustrative embodiments. Computing system environment 500 is only one example of a suitable computing environment and is not intended to suggest any limitation as to the scope of use or functionality contained in the disclosure. Computing system environment 500 should not be interpreted as having any dependency or requirement relating to any one or combination of components shown in illustrative computing system environment 500.

Computing system environment 500 may include predictive security analysis computing device 501 having processor 503 for controlling overall operation of predictive security analysis computing device 501 and its associated components, including Random Access Memory (RAM) 505, Read-Only Memory (ROM) 507, communications module 509, and memory 515. Predictive security analysis computing device 501 may include a variety of computer readable media. Computer readable media may be any available media that may be accessed by speech and text analysis computing device 501, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by speech and text analysis computing device 501.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on predictive security analysis computing device 501. Such a processor may execute computer-executable instructions stored on a computer-readable medium.

Software may be stored within memory 515 and/or storage to provide instructions to processor 503 for enabling predictive security analysis computing device 501 to perform various functions as discussed herein. For example, memory 515 may store software used by speech and text analysis computing device 501, such as operating system 517, application programs 519, and associated database 521. Also, some or all of the computer executable instructions for predictive security analysis computing device 501 may be embodied in hardware or firmware. Although not shown, RAM 505 may include one or more applications representing the application data stored in RAM 505 while predictive security analysis computing device 501 is on and corresponding software applications (e.g., software tasks) are running on predictive security analysis computing device 501.

Communications module 509 may include a microphone, keypad, touch screen, and/or stylus through which a user of predictive security analysis computing device 501 may provide input, and may also include one or more of a speaker for providing audio output and a video display device for providing textual, audiovisual and/or graphical output. Computing system environment 500 may also include optical scanners (not shown).

Predictive security analysis computing device 501 may operate in a networked environment supporting connections to one or more other computing devices, such as computing device 541 and 551. Computing devices 541 and 551 may be personal computing devices or servers that include any or all of the elements described above relative to predictive security analysis computing device 501.

The network connections depicted in FIG. 5 may include Local Area Network (LAN) 525 and Wide Area Network (WAN) 529, as well as other networks. When used in a LAN networking environment, predictive security analysis computing device 501 may be connected to LAN 525 through a network interface or adapter in communications module 509. When used in a WAN networking environment, predictive security analysis computing device 501 may include a modem in communications module 509 or other means for establishing communications over WAN 529, such as network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A method for predictive analysis of unauthorized activity, comprising:

generating, by a predictive analysis computing device, a predictive AI model for predicting future unauthorized activity involving one or more electronic devices based on a data set including historical unauthorized activity events, the data set including a plurality of events, identification of a time at which each event occurred, a type of each event, and a location of each event;

executing, by the predictive analysis computing device, a first network crawler configured to navigate to one or more websites providing news articles, the first network crawler further configured to identify news articles including one or more key words relating to unauthorized activity involving a type of electronic device corresponding to the one or more electronic devices;

executing, by the predictive analysis computing device, a second network crawler configured to navigate through a plurality of social media networks, the second network crawler further configured to identify social media content involving unauthorized activity involving the type of electronic device corresponding to the one or more electronic devices;

processing, by the predictive analysis computing device, the identified news articles and social media content through the predictive AI model to determine a predicted future event involving unauthorized activity, the predicted future event including a type of unauthorized activity, a time of the unauthorized activity, and a location of the unauthorized activity, wherein the predictive AI model is configured to:

identify one or more trends in the data set including historical unauthorized activity events;

determine one or more possible future events;

determine a probability for each of the one or more possible future events based on the identified one or more trends;

determining, by the predictive analysis computing device, a mitigation activity for the predicted future event; and transmitting, by the predictive analysis computing device, a notification of the mitigation activity to a mitigation system for implementation.

2. The method of claim 1, wherein the data set further includes identification of a model of the one or more electronic devices associated with each event.

3. The method of claim 1, wherein the type of electronic device includes an automated teller machine (ATM),
wherein the predictive AI model includes a plurality of nodes and a plurality of connections connecting the nodes, and
wherein determining the probability for each of the one or more possible future events includes determining one or more connection weights associated with one or more nodes corresponding to the possible future event.

4. The method of claim 1, wherein determining the mitigation activity includes determining a technique used in at least one unauthorized activity reported in the identified news articles and the identified social media content.

5. The method of claim 1, wherein determining the mitigation activity further includes determining a size of a law enforcement presence.

6. The method of claim 1, further comprising:
determining a required inventory of security supplies for at least one geographic location based on the predicted future event,
wherein the notification includes information specifying the required inventory of security supplies for the at least one geographic location.

7. The method of claim 1, further comprising:
collecting incident reports received by an organization to which the predictive analysis computing device belongs; and
training the predictive AI model using the collected incident reports.

8. The method of claim 1, further comprising:
processing the identified news articles and social media content through the predictive AI model to determine a plurality of predicted events, including:
processing a first portion of the identified news articles and social media content corresponding to a first geographic location;
generating a first predicted event based on the processed first portion of the identified news articles and social media content;
processing a second portion of the identified news articles and social media content corresponding a second geographic location, the first portion and the second portion being different; and
generating a second predicted event based on the processed second portion of the identified news articles and social media content.

9. An apparatus comprising:
a processor; and
memory storing computer-readable instructions that, when executed by the processor, cause the apparatus to:
generate a predictive AI model for predicting future unauthorized activity involving one or more electronic devices based on a data set including historical unauthorized activity events, the data set including a plurality of events, identification of a time at which each event occurred, a type of each event, and a location of each event;
execute a first network crawler configured to navigate to one or more websites providing news articles, the first network crawler further configured to identify news articles including one or more key words relating to unauthorized activity involving a type of electronic device corresponding to the one or more electronic devices;
execute a second network crawler configured to navigate through a plurality of social media networks, the second network crawler further configured to identify social media content involving unauthorized activity involving the type of electronic device corresponding to the one or more electronic devices;
process the identified news articles and social media content through the predictive AI model to determine a predicted future event involving unauthorized activity, the predicted future event including a type of unauthorized activity, a time of the unauthorized activity, and a location of the unauthorized activity,
wherein the predictive AI model is configured to:
identify one or more trends in the data set including historical unauthorized activity events;
determine one or more possible future events;
determine a probability for each of the one or more possible future events based on the identified one or more trends;
determine a mitigation activity for the predicted future event; and
transmit a notification of the mitigation activity to a mitigation system for implementation.

10. The apparatus of claim 9, wherein the data set further includes identification of a model of the one or more electronic devices associated with each event.

11. The apparatus of claim 9, wherein the type of electronic device includes an automated teller machine (ATM),
wherein the predictive AI model includes a plurality of nodes and a plurality of connections connecting the nodes, and
wherein determining the probability for each of the one or more possible future events includes determining one or more connection weights associated with one or more nodes corresponding to the possible future event.

12. The apparatus of claim 9, wherein determining the mitigation activity includes determining a technique used in at least one unauthorized activity reported in the identified news articles and the identified social media content.

13. The apparatus of claim 9, wherein the apparatus is further caused to:
determine a required inventory of security supplies for at least one geographic location based on the predicted future event,
wherein the notification includes information specifying the required inventory of security supplies for the at least one geographic location.

14. The apparatus of claim 9, wherein the apparatus is further caused to:
collect incident reports received by an organization to which the apparatus belongs; and
train the predictive AI model using the collected incident reports.

15. The apparatus of claim 9, wherein the apparatus is further caused to:
process the identified news articles and social media content through the predictive AI model to determine a plurality of predicted events, including:
process a first portion of the identified news articles and social media content corresponding to a first geographic location;
generate a first predicted event based on the processed first portion of the identified news articles and social media content;

process a second portion of the identified news articles and social media content corresponding a second geographic location, the first portion and the second portion being different; and generate a second predicted event based on the processed second portion of the identified news articles and social media content.

16. A non-transitory computer-readable medium storing computer-readable instructions that, when executed by a processor, cause a predictive analysis apparatus to:

generate a predictive AI model for predicting future unauthorized activity involving one or more electronic devices based on a data set including historical unauthorized activity events, the data set including a plurality of events, identification of a time at which each event occurred, a type of each event, and a location of each event;

execute a first network crawler configured to navigate to one or more websites providing news articles, the first network crawler further configured to identify news articles including one or more key words relating to unauthorized activity involving a type of electronic device corresponding to the one or more electronic devices;

execute a second network crawler configured to navigate through a plurality of social media networks, the second network crawler further configured to identify social media content involving unauthorized activity involving the type of electronic device corresponding to the one or more electronic devices;

process the identified news articles and social media content through the predictive AI model to determine a predicted future event involving unauthorized activity, the predicted future event including a type of unauthorized activity, a time of the unauthorized activity, and a location of the unauthorized activity, wherein the predictive AI model is configured to:

identify one or more trends in the data set including historical unauthorized activity events;

determine one or more possible future events;

determine a probability for each of the one or more possible future events based on the identified one or more trends;

determine a mitigation activity for the predicted future event; and transmit a notification of the mitigation activity to a mitigation system for implementation.

17. The non-transitory computer-readable medium of claim 16, wherein the data set further includes identification of a model of the one or more electronic devices associated with each event.

18. The non-transitory computer-readable medium of claim 16, wherein the type of electronic device includes an automated teller machine (ATM), wherein the predictive AI model includes a plurality of nodes and a plurality of connections connecting the nodes, and wherein determining the probability for each of the one or more possible future events includes determining one or more connection weights associated with one or more nodes corresponding to the possible future event.

19. The non-transitory computer-readable medium of claim 16, wherein determining the mitigation activity includes determining a technique used in at least one unauthorized activity reported in the identified news articles and the identified social media content.

20. The non-transitory computer-readable medium of claim 16, wherein the predictive analysis apparatus is further caused to:

determine a required inventory of security supplies for at least one geographic location based on the predicted future event, wherein the notification includes information specifying the required inventory of security supplies for the at least one geographic location.

\* \* \* \* \*